March 1, 1966  B. D. PARSONS  3,237,716
DETACHABLE HEAT SHIELD FOR EXHAUST MUFFLER
Filed July 21, 1964
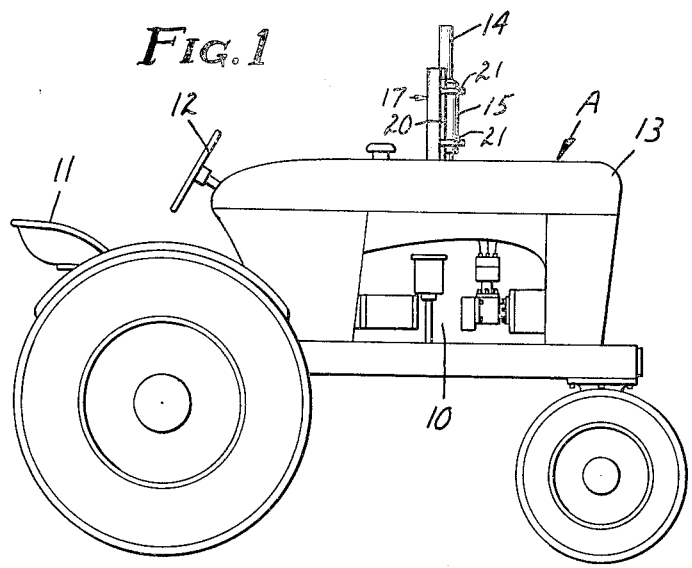
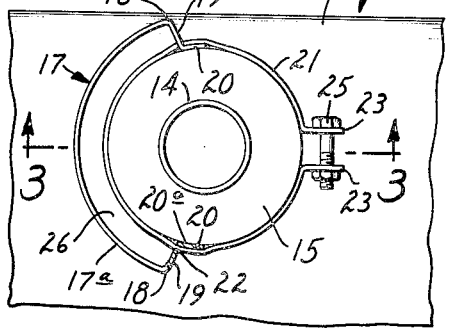
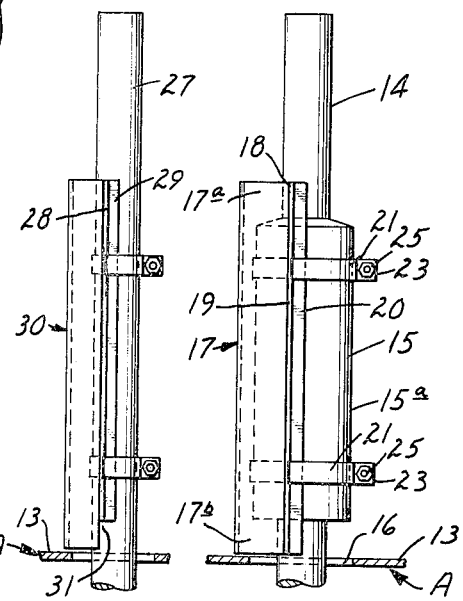
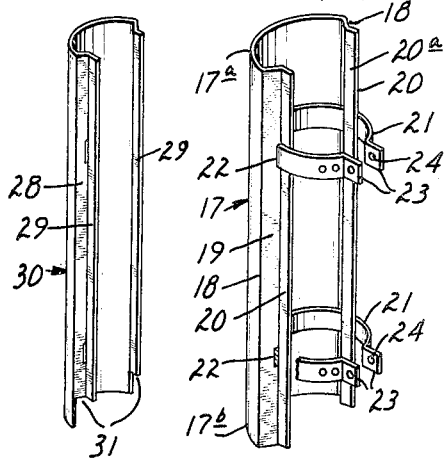
INVENTOR
BILLIE D. PARSONS
BY Merchant, Merchant & Gould
ATTORNEYS United States Patent Office 3,237,716
Patented Mar. 1, 1966

3,237,716
DETACHABLE HEAT SHIELD FOR
EXHAUST MUFFLER
Billie D. Parsons, Milesville, S. Dak.
Filed July 21, 1964, Ser. No. 384,064
3 Claims. (Cl. 181—72)

My invention relates generally to improvements in farm tractors and the like, and more particularly to novel means for shielding the driver from the heat emanating from the exhaust systems of internal combustion engines associated with said tractors.

In the conventional farm tractor, the engine is disposed forwardly of the driver. Consequently, the exhaust pipe as well as the exhaust muffler project upwardly through the hood overlying the engine, forwardly of the driver. On hot days radiant heat emanating from the muffler as well as the heat carried by the adjacent air stream become almost unbearable for the driver.

My invention relates to a novel means for shielding the tractor driver from such radiant and air-borne heat, and has for its primary object the provision of a novel device which may be readily secured to the muffler or exhaust stack of such a tractor and/or muffler in a minimum of time and with a minimum of effort.

A further object of my invention is the provision of a device of the class above described which is extremely inexpensive to produce, is light in weight, and is sufficiently compact as to facilitate shipment and storage.

A further object of my invention is the provision of a device of the class described which may be readily adjusted to the most effective position, which does not materially impede the version of the driver, and which is rugged and durable in use.

The above and still further objects of my invention will become apparent from the following detailed specification, appended claims, and attached drawings.

Referring to the drawings wherein like characters indicate like parts throughout the several views:

FIG. 1 is a view in side elevation of a conventional farm tractor showing my novel invention;

FIG. 2 is an enlarged fragmentary view in top plan;

FIG. 3 is a view in section as seen from the line 3—3 of FIG. 2, portions thereof being shown in elevation;

FIG. 4 is a view in perspective of my novel heat shielding attachment;

FIG. 5 is a view similar to FIG. 4 showing a slightly modified form thereof; and FIG. 6 is a view corresponding to FIG. 3, but illustrating the structure of FIG. 5 in use.

Referring with greater particularity to the drawings, the letter A identifies in its entirety a tractor of the farm type, the internal combustion engine being identified by 10, the driver seat by 11, the steering wheel by 12, the generally horizontally disposed hood, overlying the engine 10, by 13, the vertically disposed exhaust stack by 14, and the diametrically enlarged muffler, of conventional design, by 15.

In conventional manner, as shown particularly in FIG. 3, the exhaust stack 14 projects upwardly through a diametrically enlarged opening 16 in the hood 13 to prevent vibratory engagement between these elements occasioned by vibration of the motor and passage of the tractor over rough terrain. However, it is obvious that heat emanating from the engine 10 passes upwardly through the opening 16. This heat, of course, under forward movement of the tractor A, passes upwardly and rearwardly toward the driver, not shown but seated upon the seat 11, along with radiant and air-borne heat from the stack 14 and the muffler 15.

My novel heat deflecting attachment comprises an elongated, preferably cross-sectionally arcuate baffle member 17, the opposite longitudinal edge portions 18 of which are interned to define radially inwardly projecting legs 19, and generally right angularly disposed elongated feet 20, which, as shown, have relatively flat opposed inner surfaces 20a.

As shown in FIGS. 1 to 3, inclusive, my novel attachment, shown in FIG. 4, is affixed to the diametrically enlarged muffler 15 by means of a pair of axially spaced split clamping bands 21, the intermediate portions of which pass through opposed openings 22 in the legs 19 in overlying relationship to the feet 20, and the outer ends of which are angularly outwardly formed to define ears 23 having aligned opening 24 therein for the reception of nut-equipped clamping bolts 25.

It will be noted that the opposed inner surfaces 20a of the feet 20 engage the shell 15a of the muffler 15 in generally opposed circumferentially spaced relationship to each other. Preferably the longitudinal dimensions of the baffle 17 are sufficiently greater than the axial dimension of the muffler 15 so that the upper and lower extremities 17a, 17b thereof extend respectively above and below the muffler 15. As shown particularly in FIG. 2, the baffle 17 is generally concentric to but radially outwardly spaced from the shell 15a whereby to define therebetween a segmental air-passage 26.

For the most efficient use of my heat deflecting attachment, the lower end 17b of the baffle 17 is caused to substantially engage the hood 13, radially outwardly of the opening 16 and with the baffle 17 being interposed between the shell 15 and a driver on said seat. With this arrangement, the baffle 17 effectively deflects the radiant heat emanating from the muffler 15 from the tractor driver. Additionally, due to the particular arrangement shown, the lower portion 17b of the baffle 17 (below the muffler 15) acts as an air scoop during forward movement of the tractor A, whereby to greatly increase the movement of air through the passage 26 so as to more rapidly carry away air-borne heat accumulating within. Additionally, as the relatively cool air enters the lower end of the passage 26, it pulls with it all hot air emanating from the engine 15 through the annular opening 16. The greater the velocity of air passing through the passage 26, the higher up and above the level of the driver it will be projected.

In the slightly modified version of my invention shown in FIGS. 5 and 6, my novel attachment is shown as being secured directly to an exhaust standpipe 27 having no muffler thereon. Consequently, to achieve the utmost efficiency, the lower end portions of the legs 28 and the feet 29 of the baffle 30 are notched away, as at 31, so as to provide an air scoop which is the equivalent of that provided by the lower portion 17b of FIGS. 1-3, inclusive.

My invention has been thoroughy tested and found to be completely satisfactory for the accomplishment of the above objects; and while I have disclosed a preferred embodiment thereof, same may well be capable of modification without departure from the scope and spirit of the appended claims.

What is claimed is:

1. A heat deflecting attachment for the exhaust mufflers of farm tractors and the like, said attachment comprising:
   (a) an elongated heat deflecting baffle member,
   (b) opposite longitudinal edges of said baffle member being interned to define radially inwardly projecting legs which terminate in generally right angularly disposed elongated relatively flat feet adapted to engage the shell of a muffler at circumferentially spaced points along a major portion of the length of each thereof, and
   (c) means for detachably securing said baffle to the exterior of a muffler so as to shield the driver of the tractor, (d) said means comprising a pair of axially spaced clamping bands, one each passing through opposed openings in said legs and overlying said feet whereby to embrace the shell of said muffler.

2. The structure defined in claim 1 in which said baffle has a cross-sectional contour corresponding substantially to that of the shell of said muffler whereby, in cooperation with said shell, to define a segmental air passage.

3. The structure defined in claim 2 in which the longitudinal dimensions of said baffle are greater than that of the muffler on which it is intended to be used, whereby the lower and upper portions thereof project below and above said muffler, said baffle below said muffler defining a forwardly opening air scoop communicating with said passage.

References Cited by the Examiner

UNITED STATES PATENTS

| | | | |
|---|---|---|---|
| 2,097,041 | 10/1937 | Powell. | |
| 2,313,772 | 3/1943 | Russell | 138—46.5 |
| 2,508,463 | 5/1950 | May | 181—72 X |

LEO SMILOW, *Primary Examiner.*